April 13, 1926.                                      1,580,350
                      I. M. UPPERCU
              DRIVING COUPLING FOR UNIVERSAL JOINTS
                    Filed Oct. 21, 1921          2 Sheets-Sheet 1
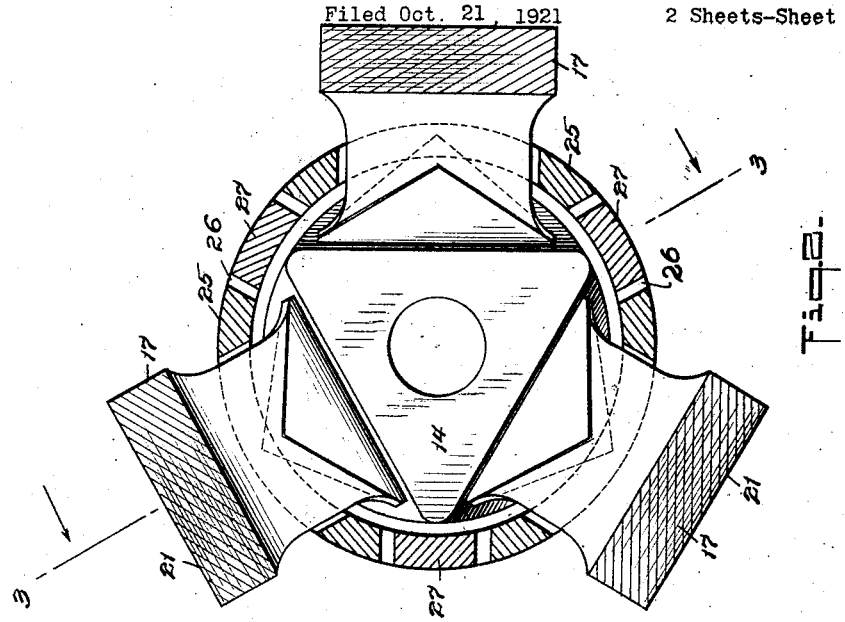
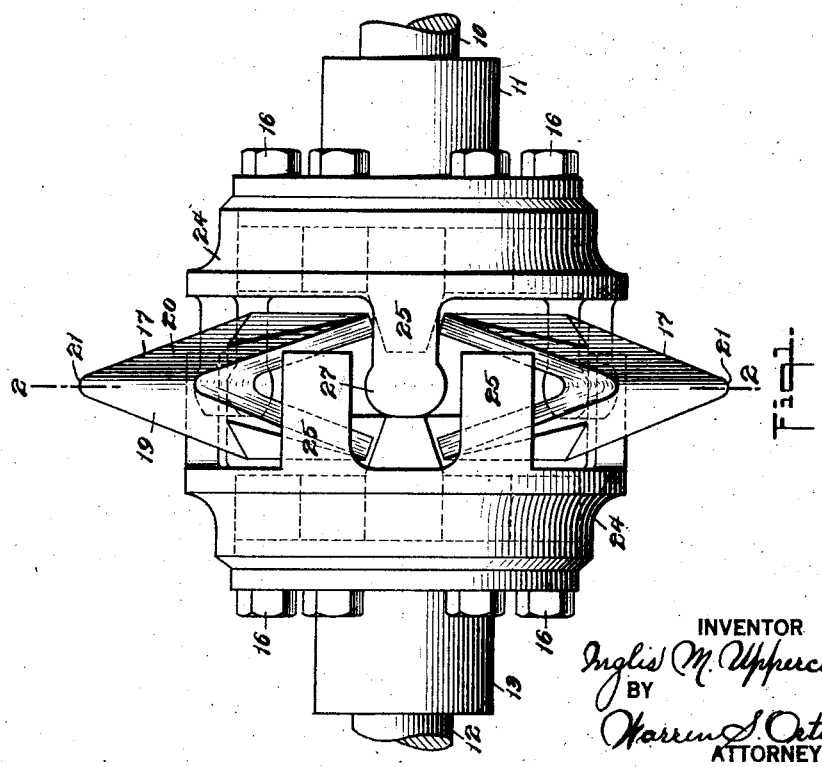
INVENTOR
Inglis M. Uppercu,
BY
Warren S. Orton.
ATTORNEY

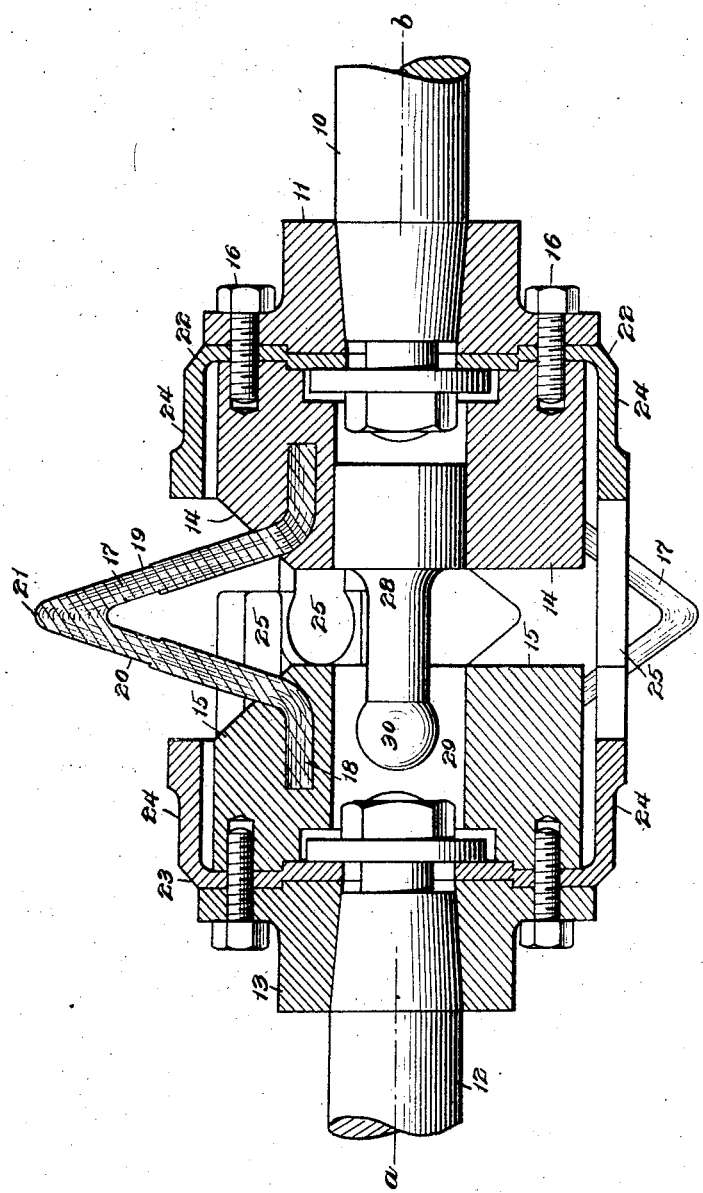

Patented Apr. 13, 1926.

1,580,350

UNITED STATES PATENT OFFICE.

INGLIS M. UPPERCU, OF DEAL, NEW JERSEY.

DRIVING COUPLING FOR UNIVERSAL JOINTS.

Application filed October 21, 1921. Serial No. 509,222.

*To all whom it may concern:*

Be it known that I, INGLIS M. UPPERCU, a citizen of the United States, and resident of Deal, in the county of Monmouth and State of New Jersey, have invented certain new and useful Improvements in Driving Couplings for Universal Joints, of which the following is a specification.

The invention relates to a universal joint in a driving coupling and constitutes an improvement in the form of such joints disclosed in the patents to Roland Chilton, Nos. 1,379,962 and 1,379,964, patented May 31st, 1921.

The joints disclosed in the above identified patents are characterized by a disposition of novel spring structures between a driving and driven member. The spring structures are formed of laminated flat plates, having middle portions V-shaped in side elevation which extend radially from the common axis of rotation of the members and have their greatest cross-sectional width disposed tangent to the thrown circle of rotation about the axis described by the outer edges of the V-springs. This provides for extreme flexibility in responding to axial and relative angular movement of the driving and driven members and relative rigidity in transmitting rotary torque. In those cases where extreme flexibility is desired in order to permit the desired axial and angular movements of the driving and driven members connected by these spring structures, the flat plates are made extremely thin. This is particularly apt to develop a tendency on the part of the spring plates to twist in their effort to transmit abnormally high rotary torque forces when under maximum loads or under overload conditions. Any twisting of these plates beyond their elastic limits, or even approaching their elastic limits, seriously impairs the continued efficiency of the connection, and acts to minimize the desired rigidity of such structures to transmit abnormal rotary torque forces.

Accordingly, one of the objects of the invention is to provide a simple structure of joint of the type outlined for preventing distortion of the V-shaped spring plates when subjected to rotary torque forces which have a tendency to twist the plates and which, at the same time, will offer no interruption to the flexibility of the joint when functioning to transmit normal loads.

I attain this phase of the invention by providing clutching jaws or fingers which extend from each of the hubs, in lapping relation, which are normally out of contact with a small clearance between their mutual driving faces, and which are designed so that when the members are rotated about their axes, relative to each other and over the permissible angle provided by the clearance the rotary torque between the members is transferred from the spring connection and transmitted through the rigid connection provided by the interengaging jaws of the clutch and in this way distorting strains are removed from the spring plate connections.

It is appreciated that the spring structures of the above identified patents are liable to break, and this is especially true where extremely thin plates are used and subjected to high rotary torque forces. In those situations where one of the end members or other parts of the coupling are supported from the other member through the agency of the spring drive, much damage is apt to be caused to adjacent structure on the failure of the springs to support the parts in their operative positions. For instance, when the device constitutes part of the transmission shaft in an automobile power construction, the falling of the end of the driven shaft to the ground would be a cause of serious damage to the car especially when moving under its high inertia speed.

Accordingly, another object of the invention is to provide a safety device which will be normally inoperative and thus have no influence on the spring coupling in its normal operation, but which will come into operative position in case of a failure of the spring drive to support the parts and which, when in operative position, will act to prevent the members from entirely separating and thus maintain the severed parts of the driving connection at least approximately in their normal position.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a view in side elevation of a preferred embodiment of the invention;

Figure 2 is a transverse sectional view taken on the line 2—2 of Figure 1; and

Figure 3 is a longitudinal view taken axially of the device and on the line 3—3 of Figure 1 looking in the direction indicated by the arrows.

In the following description and in the claims, parts will be identified by specific names for convenience of expression but they are intended to be as generic in their application to similar parts as the art will permit.

In the drawings there is shown a driving shaft 10 provided with an attaching face plate 11 and a driven shaft 12 provided with a similar plate 13 between which plates 11 and 13 is positioned a unitary preformed structure in the form of a power transmitting coupling. This coupling includes massive end hubs or hub members 14 and 15 attached respectively to the plates 11 and 13 by means of the usual fastening through bolts 16. The hub members are connected by a plurality of spring plate structures 17 which normally constitute the sole connection between the hub members.

These spring plate structures are shown in Fig. 2 to be three in number and disposed 120° apart about the common and normal axis of rotation indicated by the line a—b in Figure 3. Each spring structure is made up of a plurality of thin, wide sheets of spring metal, V-shaped in side elevation as particularly shown in the upper part of Figure 3. The spring plates rest one on the other to provide a laminated structure, in which the lamina or rather the middle portion of each lamina is capable of very slight relative movement. Opposite ends of the laminated structure are in the form of out-turned and parallel end portions 18 which have their greatest cross-sectional width extending tangent to the thrown circle of rotation described by the crown edges of the V-springs. The end portions of the laminated structures are securely held together in this position and fixed against relative movement preferably by casting the hub members onto the ends thereby to securely anchor the spring plates in position free of initial loads. The middle portion of the spring structure extends radially outward from the common axis of rotation a—b to form a V-shaped extension with sides 19 and 20 meeting at the angle of the V to form a relative sharp crown edge 21. The structure thus far described corresponds, in a general way, to the disclosures in the above identified patents.

One of the features of the present disclosure is the providing of a clutch constituting a supplemental driving connection between the hub members when the hub members have been rotated over a preset and relatively small angle. The clutch is formed of two dish shaped plates 22 and 23 with one of the plates secured between the face plate 11 and the adjacent member 14 and the other clutch plate similarly disposed on the opposite side of the spring connection between the member 15 and its adjacent face plate 13. The clutch plates are demountably secured in place by the bolts 16 and the parts are so designed that the clutch element may be omitted if desired. Each plate is provided with a flange 24 which telescopes the adjacent hub member and is provided at its free edge with a plurality of projecting fingers or jaw elements 25. The projecting fingers from the plates coact to form a crown clutch with fingers lapping each other circumferentially of the axis of rotation and normally spaced apart to provide slight clearances 26 (see Fig. 2). The fingers of one of the plates is provided with rounded head 27 so as to minimize interference between the fingers when the axes of the hubs are disposed at angles to each other during the operation of the device. The fingers are so disposed that the spring structures can project between the same to the exterior of the crown clutch and so that there will be a clearance between the springs and clutch in all positions of the same.

Another feature of the disclosure is the providing of means for preventing the hub members from falling away from each other in case of failure of the spring connection to maintain the members in their relative position. For this purpose one of the members 14 is provided with a pin 28 driven into the same with a frictionally tight fit. The pin projects axially from the member 14 and extends into a recess 29 formed axially in the adjacent face of the other hub member 15. The free end of the pin in the recess 29 is provided with a rounded head 30 and is normally disposed in such spaced relation to the side of the recess 29 that the pin does not contact with the hub during the normal operation of the device. The safety device is entirely out of action as long as the device functions either with the spring or the clutch constituting the driving connection. The pin is of such length and extends into the recess for such a distance that in case the spring structures should break, the loose hub member will simply fall until the pin contacts with the lower side of the recess. Assuming that in the drawing the shaft 12 is a floating shaft supported from the driving shaft 10, then in case the spring structure 17 breaks or sags the hub 14 will support the free hub 15. It will be understood that this intersupporting of the two shafts will be maintained even though the shaft 10 continues to rotate as would be the case where the engine driving the shaft 10 continued to drive the shaft after an accident to the spring drive In operation it will be understood that the device will function normally, as described in the above identified patents, and the shafts will be free to move relative to each other both axially and at an angle without interference from either the clutch device or from the safety device featured in this disclosure. However, should the shafts tend to rotate relative to each other and beyond the angle of rotation set by the clearance between the fingers of the clutch, the fingers will contact and thus provide a rigid driving connection between the hub members.

By means of a device of this character it is possible to retain all of the advantages inherent in the patented spring couplings and at the same time to save the springs from abnormal twists or distortions in their tendency to transmit abnormal torque forces. In this way the life of the spring joint is prolonged and its efficiency maintained even under conditions where the torque forces are changing suddenly, or where the driving forces are shifting rapidly from one to the other of the hub members. There is further provided two degrees of torsional rigidity. The spring connection is comparatively rigid and manifests its flexibility only when subjected to overloads while the clutch is of course a positively rigid drive.

While the safety device has been featured herein for the purpose of preventing entire separation of the coupling parts in case of failure of the springs it is appreciated that the safety device can be so designed that it will come into operation on any abnormal relative lateral movement between the hub members and this way will act to prevent strains on the springs due to relative lateral movement of the members in the same way that the clutch prevents abnormal relative twist between the hub members.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In an elastic coupling, the combination of a driven and driving element mounted for rotary movement, a flexible connection therebetween including a laminated spring plate structure with the plates thereof having their greatest cross-section extending substantially in the direction of rotation of one of the members whereby said device is characterized by freedom in relative angular movement of the members and by rigidity of relative torsional movement, and means for limiting the permissible relative circumferential movement of the members and thus limiting the distorting effect of torsional forces transmitted through the spring plate structure while permitting freedom of relative movement between the members in all other directions.

2. In an elastic shaft coupling, the combination of driven and driving elements mounted for rotary movement about an axis of rotation, a flexible connection therebetween including a laminated spring plate structure with its middle portion projecting radially relative to said axis of rotation and means extending between said elements and interlapping each other circumferentially of the axes of rotation for limiting the permissible twist of said radially projecting spring plates out of their normal position when the elements are moved relative to each other circumferentially of the axis of rotation.

3. In a device of the class described, the combination with a driving and a driven member normally disposed with their axes in substantial alignment, of a flexible coupling disposed therebetween and normally constituting the sole means for transmitting rotary movement from the driving to the driven member, said coupling including a spring member comprising a plurality of laminate spring plate elements extending between their ends in a direction radially of said axis of rotation and supplemental driving coupling means extending between the members, said supplemental means being normally inoperative thereby to permit the flexible coupling to function independently of the supplemental coupling means, said supplemental coupling means being controlled by the relative movement of said members when subjected to torsional force capable of distorting the flexible coupling.

4. In an elastic shaft coupling, the combination with a driven and a driving element having a common axis of rotation, of two driving connections therebetween, one being normally operative and the other being normally inoperative and movable into operative position by a preset relative angular movement of the elements about said axis, the normally operative connection including spring plates disposed tangent to the circle of rotation of the elements and said spring plate connection characterized by relative freedom in angular movement of the elements and by relative rigidity of torsional movement within the preset permissible relative angular movement of the elements.

5. A power transmission coupling including a pair of end members, a spring plate therebetween having an end portion mounted in one of the members for rotary movement about an axis of rotation and a V-shaped portion constituting a continuation of the end portion and extending radially of the axis of rotation, the V-shaped portion formed of flat sides connected integrally along a common crown edge, and extensions from the end members lapping each other, normally spaced apart circumferentially of said axis of rotation and movable into power transmitting engagement when the flat sides of the V-shaped portions have exceeded a permissible twist under torsional forces acting on the end members.

6. A power transmitting coupling including a pair of hubs, a pair of plate spring structures connecting the hubs, said structures each including flat plates with their end portions secured to said hubs and approximately V-shaped portions connecting the end portions and extending therefrom radially of the axis of rotation of the hubs, a pair of fingers one projecting from each hub, positioned in the space between the pair of V-shaped spring portions, said fingers being normally spaced apart and adapted, on the relative rotation of the hubs about their axes, to contact and thus provide a rigid driving connection between the hubs to relieve torsional strains on said V-shaped portions of the plate spring structures.

7. In a device of the class described, the combination of a driving member, a driven member, a flexible spring driving connection therebetween, said connection providing for relative freedom of angular movement between the members and for relative rigidity in transmitting rotary torque, and safety means extending between the members for preventing the same from becoming detached on the failure of the spring driving connection as a connecting means, said members being normally free of any restraint from said safety means.

8. In a device of the class described, the combination of a driving member, a driven member, a flexible spring driving connection therebetween and a projection from one of the members fitting loosely in a recess in the other member and in spaced relation in all normal positions of the members so as not to interfere with the members in their normal relative movements, said projection and recess coacting to prevent entire separation of the members in case of breakage of the spring connection.

9. In a device of the class described the combination of a driving member and a driven member having a common axis of rotation, one of the members provided on the side facing the other member with an axially extending recess, a projection extending axially from the other member and projecting into the recess and normally disposed in spaced relation to the side thereof, and a flexible spring drive normally constituting the sole connection between the members, and adapted to support one from the other, and said spring spaced from the projection.

10. In a device of the class described, the combination of a driving member, a driven member and three connections therebetween, one of said connections being a flexible spring drive normally constituting the sole connection, the second connection being normally inoperative and providing a delayed engagement for transmitting rotary torque between the members when the spring connection has been flexed beyond a prescribed limit and the third connection being normally inoperative and in spaced relation to one of the members, functioning on the failure of said spring connection and then acting to prevent the members from separating.

11. In a device of the class described, the combination of a driving and a driven member, a rigid extension extending axially from one of the members lapping a part of the other member, said extension being disposed normally in spaced relation to said other member radially of its axis of rotation so as not to interfere with the relative movements of the members in any direction, a spring driving connection between the members comprising three V-shaped springs, spaced apart circumferentially of the axis of rotation, each side of each spring being flat and said connection also acting to maintain the extension in spaced relation to said other member, said extension movable into engagement with said other member on the failure of said spring connection to maintain the extension in its normal position spaced from the other member.

12. In a device of the class described, the combination of a driving connection which includes two hub members, mounted for normal rotary movement about a common axis of rotation, three V-shaped springs, spaced 120° apart about the axis of rotation, each spring having its opposite ends secured to the hub members and having an intermediate part extending radially from said axis of rotation and means having parts connected to said hubs for limiting the twisting of said radially extending part of the spring.

13. A flexible coupling including a pair of hubs having a limited freedom of relative axial movement, fingers extending in lapped relation from each of the hubs and adapted when the hubs are rotated relative to each other to provide a relatively rigid driving connection therebetween, and a spring drive including a plurality of V-shaped springs disposed between the hubs rigidly connected at their ends to the hubs, acting normally to maintain the fingers in inoperative relation, said spring drive and said fingers coacting to provide relative freedom of angular movement of the hubs and to provide two degrees of torsional rigidity.

14. A flexible coupling including a pair of hubs normally having a common axis of rotation and having a limited freedom of relative movement along said axis, a plurality of V-springs constituting a connection therebetween and normally constituting the sole means for driving one hub from the other, said connection characterized by relative freedom of angular movement of the hubs and by relative rigidity in the transmission of rotary torque and a supplemental driving connection including elements extending from the hubs and normally having a clearance therebetween but when in contact having no flexibility in transmitting rotary torque, said supplemental connection being normally inoperative and manifesting its operativeness when the hubs have rotated about the axis and over the angle permitted by said clearance.

Signed at New York city in the county of New York and State of New York, this 6th day of October, A. D. 1921.

INGLIS M. UPPERCU.